March 12, 1963 R. A. BURKLEY 3,080,748
STRAIN DETECTION APPARATUS
Filed Nov. 27, 1959 2 Sheets-Sheet 1

INVENTOR.
RALPH A. BURKLEY
BY
*A. H. Oldham*
ATTORNEY

March 12, 1963   R. A. BURKLEY   3,080,748
STRAIN DETECTION APPARATUS
Filed Nov. 27, 1959   2 Sheets-Sheet 2

INVENTOR.
RALPH A. BURKLEY
BY
*A. H. Oldham*
ATTORNEY

United States Patent Office 3,080,748
Patented Mar. 12, 1963

3,080,748
STRAIN DETECTION APPARATUS
Ralph A. Burkley, Cuyahoga Falls, Ohio, assignor to Goodyear Aircraft Corporation, Akron, Ohio, a corporation of Delaware
Filed Nov. 27, 1959, Ser. No. 855,667
5 Claims. (Cl. 73—88.5)

This invention relates to strain detection apparatus, and more particularly, is concerned with apparatus for the detection of strains in articles of various materials such as reinforced plastics and the like, the apparatus normally functioning without the destruction of the article subjected to strains.

Heretofore, non-destructive testing methods have been utilized in testing the strength and fatigue characteristics of plastic structures, and particularly reinforced plastic structures. Such non-destructive testing methods, including transmitted light, ultrasonic testing, and static load testing, are not fully satisfactory, and there has been a need for testing procedures offering more specific information and increased reliability.

Conventional electrical resistance strain gauges do not particularly adapt themselves to fabrication into reinforced plastic structures and improved non-destructive test methods have been found desirable to ascertain the structural integrity of a plastic part on the basis of the absence of cracks, flaws, structural imperfections and residual stress concentrations in critical areas.

It is the general object of the present invention to avoid and overcome the foregoing and other difficulties of and objections to prior art practices by the provision of an improved relatively inexpensive strain detection apparatus capable of being built into or attached to a plastic structure, and particularly a reinforced plastic structure, to accurately detect the location and magnitude of critical stresses therein.

Another object of the invention is the provision of apparatus of the type described utilizing a single or a multiplicity of metallic or metallic coated filaments so connected in electric circuits and built into the plastic structure whereby strains imparted to the structure break the electrical continuity of at least certain of the filaments to provide an electrical indication of the strains imparted to the plastic structure.

Another object of the invention is to provide a strain gauge wherein frangible filament type materials of progressively breakable type are selected to cover the range of strain limits required in a given application, the apparatus being adapted to all phases of fabrication and qualification testing, the inspection of parts in storage and at any other time in the operational life of the part.

Another object of the invention is to provide in combination a plastic structure reinforced with strands, filaments, cords, or the like with at least one of such members being a frangible electric conductor running entirely through the plastic structure over substantially all areas thereof and whereby a test at any time of the electrical continuity of the conductor indicates any failure of the plastic structure.

The foregoing objects of the invention, and other objects which will become apparent as the description proceeds, are achieved by the provision of a single or plurality of frangible electric conductors positioned in substantially parallel relation to each other and adapted to be an integral part of a reinforced plastic structure so as to be strained when the structure is strained, an electric lead to each conductor, and means for determining whether and which electric conductors have been broken when the structure is strained. The gauge apparatus may include a galvanometer, a source of electric current, and a multi-point switch, for example, to facilitate determination of whether and which frangible conductors are broken when the plastic part being tested is strained.

For a better understanding of the invention reference should be had to the accompanying drawings wherein FIG. 1 is a diagrammatic plan view of a strain detection apparatus, partially broken away, incorporating the principles of the invention;

FIG. 2 is a fragmentary cross-sectional view of the apparatus taken on line 2—2 of FIG. 1;

FIGS. 3, 4, 5, and 6 illustrate cross-sectional views, on enlarged scale, through three different electro-conductive filaments constructed in accord with the invention;

Figure 1:
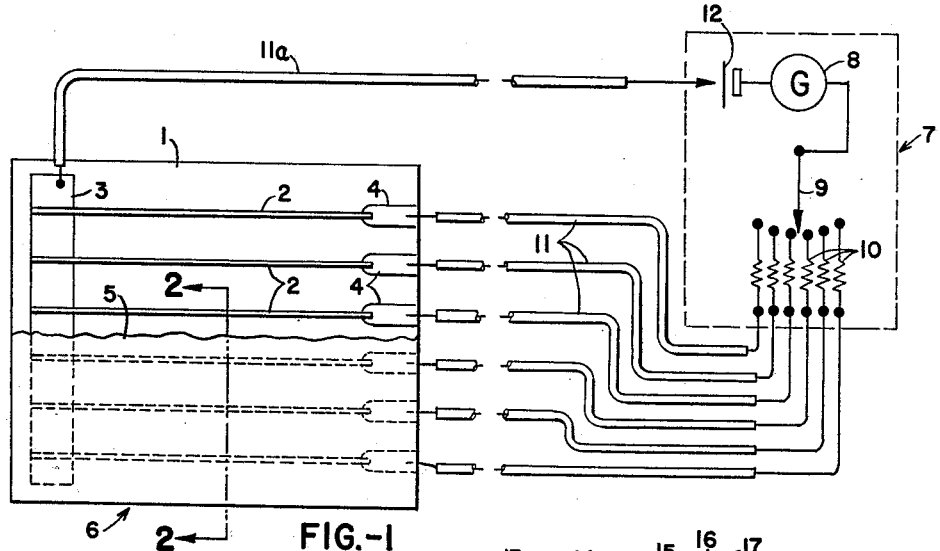

In the drawings, the numeral 1 indicates a flat flexible sheet of non-conductive material such as plastic or similar material having electrical insulating characteristics, and positioned on this sheet are a plurality of frangible electrical conductors 2, usually arranged in substantially parallel relationship in the manner illustrated. Each electrical conductor 2 is secured at one end to a connector member 3, such as a strip of metal or foil or conductive paint and at its other end is connected to a single conductive connector plate 4, the several plates being spaced along the edge of the sheet 1 opposite to the connector member 3. Covering the electrical conductors 2, the connector member 3 and connector plates 4 is a second flexible sheet of insulating material 5 which is compacted down against all of the parts of the sheet 1 to form a flat flexible wafer or sandwich gauge member indicated as a whole by the numeral 6 and shown partially in cross section in FIG. 2. It will be recognized that in FIG. 1 the covering sheet 5 has been broken away from the upper half of the wafer 6 to better illustrate the construction thereof.

Associated with the strain member or wafer 6 is apparatus indicated as a whole by the numeral 7 and including a galvanometer 8, a multi-point switch 9 and a source of electric current 12, these three elements being electrically connected in series in the manner illustrated. Each of the points of the multi-point switch 9 has an electric resistance 10 connected thereto, the resistances 10 being of progressively increased value in the manner shown by their progressively increasing length, and with the end of each resistance 10 remote from the switch 9 being connected by a flexible electric lead 11 to one of the single connector plates 4 in the manner shown. The connector member 3 is connected by a flexible wire 11a to the source of electric current 12.

Figures 3, 4:
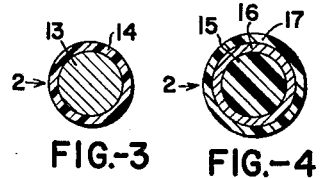
Figures 5, 6:
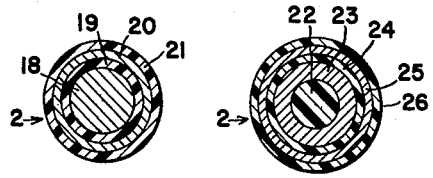

FIG. 3 illustrates one manner of constructing the frangible electric conductor 2, this embodiment of the invention including an electro-conductive core 13 having an insulating cover 14. FIG. 4 shows another manner of constructing the conductor 2 by providing an insulating core 15, an electro-conductive layer 16 surrounding the core 15, and a covering layer 17 of insulating material. FIG. 5 shows still another manner of constructing the electrical conductor 2 by using a core 18 of electro-conductive material, a covering layer 19 of insulating material, a cover or layer 20 of electro-conductive material, and a final covering layer 21 of insulating material.

FIG. 6 is a cross-section of another form of the conductor 2 utilizing a construction similar to that of FIG. 5 but with an insulating core 22, an electro-conductive layer 23 surrounding the core 22, an insulating covering layer 24 over the conductive layer 23, a second electro-conductive layer 25 over the insulating layer 24, and a second insulating layer 26 over the conductive layer 25.

The forms of element shown in FIGS. 5 and 6 are especially useful in certain applications where the element is wound in continuous integral form and it is desired to not only ascertain whether electrical continuity has been interrupted, but also at what point in the structure.

It will be understood that various materials can be utilized for the electrical conductors 2, with the materials being adapted to be electrically broken when subjected to specific tensile elongations. Many materials may be utilized as a conducting media and in the class of metals utilized in the conductor structure of FIG. 3, for example, aluminum, steel, titanium, or the like, are applicable. In electrical conductors of the type shown in FIG. 4, the non-conductive core 15 may be similarly of any suitable material, for example, a single filament of glass quartz, alumina, plastics, and the like, or a roving strand consisting of a multiple number of single similar filaments with the entire strand being conductively coated by means well-known in the art such as passage through a molten bath or vacuum deposition techniques.

Tensile elongations of the electrical conductors 2 before breaking of the electrical conductive characteristic may be made to fall within the ranges of elongation to which the structure to be tested is subjected. Usually these ranges for strain determinations in structures extend from about 0.001 to about 4.0 percent elongation. It will be recognized that elongation percentages even as high as 100% can be achieved by appropriate selection of suitable specific materials having the desired dimensional characteristics and to provide loss of electrical conductivity when elongated to the percentages stated.

The strain detection apparatus of the invention takes three basic forms. The first is that illustrated in FIG. 1 wherein each electrical conductor 2 when progressing from one side to the other of the wafer 6 has a progressively higher strain level before it becomes electrically non-conductive through its adjacent conductor. For example, the conductor 2 shown at the top of FIG. 1 is constructed to become electrically non-conductive when subjected to an elongation of 0.5 percent, the next lower conductor 2 at 1.0 percent, the next lower conductor 2 at 1.5 percent, and so on, down across the wafer 6. In this type wafer, as shown in both FIGS. 1 and 7, the conductors 2 can be placed relatively closely together, and the output of the wafer 6 when connected to the indicating means 7 indicates within one-half of one percent the tensile elongation.

Figure 8:
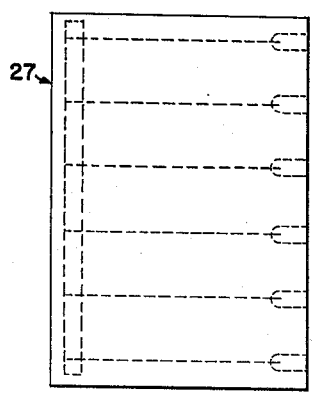
FIG. 8 is a view similar to FIG. 7 but of a modification of the form of the invention shown in FIG. 7.

The second basic form of the invention is shown in FIG. 8 wherein the wafer 27 is formed of conductors 2 all having substantially the same elongation in tensile strain direction before becoming electrically non-conductive. In this form of the invention the conductors 2 are normally positioned farther apart, with the wafer 27 being of larger size. A wafer of this type when built into a structure to be tested will indicate when safe limits are exceeded, for example, in any part of the structure covered by the wafer 27. Indicating means 7 can be used with wafer 27 with or without resistances 10 to show which frangible conductors have been broken.

Figure 9:
FIG. 9 is a view similar to FIG. 2 but of a modification of the form of the invention shown in FIG. 2.

FIG. 9 illustrates a modification of the invention wherein frangible electric conductors 28 of the same type as the conductors 2 can be directly secured, as by cement 29 directly to a plastic structure 30 which is adapted to be tested.

Figure 10:
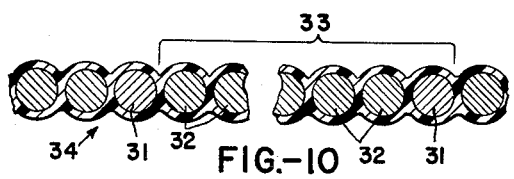
FIG. 10 is a cross-sectional exaggerated view similar to FIGS. 2 and 9 but of still another form of the invention and using but a single frangible electric conductor.

The third basic form of the invention is shown in FIG. 10, wherein only a single frangible electrical conductor 31 is wound in simultaneously with load carrying strands 32, for example as a tape 33, to reinforce a plastic structure 34. The conductor 31 and strands 32 may, for example, be wound helically with conductor 31 periodically reappearing in a sectional view like FIG. 10. In this manner, the conductor is wound entirely through the plastic structure whether it be tube, nozzle, rocket casing, nose cone, or some other article, and with some portion of the conductor being broken and rendered electrically non-conductive if the plastic structure cracks or is otherwise strained or broken beyond acceptable limits. A "go" or "no go" indicator is thus built into a plastic structure which can be quickly checked at any time during the life or use of the structure.

Figure 11:
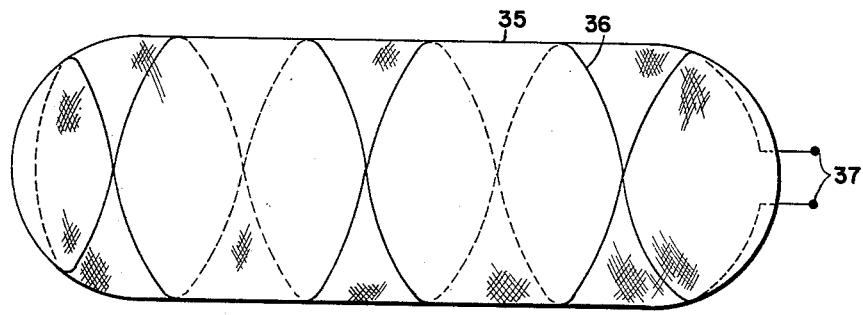
FIG. 11 is a diagrammatic exaggerated view of a typical filament-wound article utilizing the strain detection element of the invention.

FIG. 11 shows such use with a typical filament-wound article 35. As is well known in the art, such articles are formed by the helical winding on a rotating mandrel of continuous lengths of resin-impregnated filaments; such structure subsequently being cured to provide a finished piece. Thus utilizing the construction of FIG. 10, for example, as element 36 of FIG. 11, the filament-wound article has incorporated throughout its structure at least one conductive length, the two ends of which are brought out to testing terminals 37 for use with associated equipment as described hereinbefore in connection with FIG. 1. It will be obvious that although the element 36 as shown only traverses the length of the article 35 once, it is preferred in actual practice to have the element 36 interwoven in the same manner as an adjacent reinforcing element such as 32 of FIG. 10 throughout the entire structure.

Figure 12:
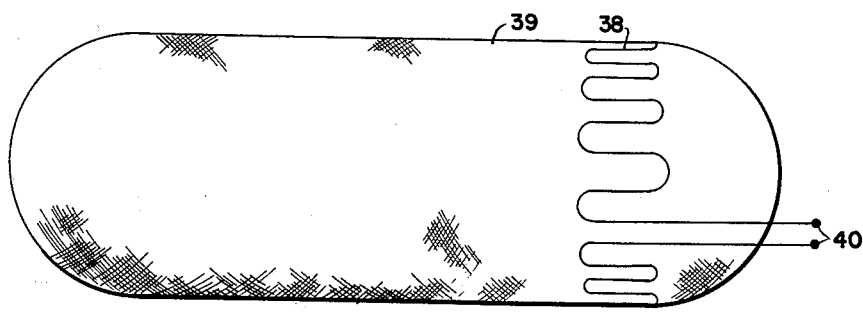
FIG. 12 is a diagrammatic view of another filament-wound article showing another embodiment of the strain detection element of the invention.

In FIG. 12 another form of utilizing conductive elements 38 in conjunction with a filament-wound article 39 is shown. Such elements 38 are wound sinuousoidally in a circumferential manner either on the surface of the article 39 or preferably laid into the wall itself, with testing terminals 40 provided at the ends of the element 38.

Figure 2:

It will be understood that any of the filament or strand element constructions shown in FIGS. 3, 4, 5, or 6 can be utilized as the elements in FIGS. 11 and 12, and that such elements can be used in the combination forms shown in FIGS. 2, 9 and 10.

Indicating means, such as means 7, will be used with the forms of the invention heretobefore described.

Figure 7:
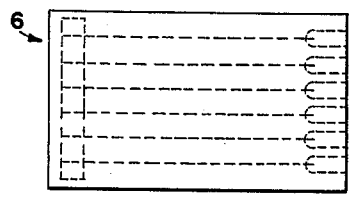
FIG. 7 is a view on a reduced scale of the strain gauge wafer forming a part of the apparatus of FIG. 1.

Furthermore, in the use of the apparatus of the invention shown in FIG. 7 or 8, such strain wafers can be constructed into a plastic structure in any desired layer or direction, and particularly in critical structural areas, and with the electrical conductors of the strain wafers normally extending in the same direction as the reinforcing means for the plastic structure.

In the form of the invention shown in FIG. 1, utilizing the different and progressively increasing resistors 10 means that the galvanometer 8 can be calibrated in terms of percent of strain and will so register when the multipoint switch 9 is swung from left to right until the first unbroken electrical conductor 2 is reached. If the resistors 10 are eliminated the galvanometer 8 shows which conductors 2 are broken.

While a certain representative embodiment and details have been shown for the purpose of illustrating the invention, it will be apparent to those skilled in this art that various changes and modifications may be made therein without departing from the spirit or scope of the invention.

What is claimed is:

1. In combination, a hollow plastic body, flexible, body-reinforcing load-carrying strands embedded in and extending helically as a continuous tape through the plastic body and molded integrally therewith, flexible, frangible, electro-conductive strand means forming a part of the tape and extending parallel to and coextensive with the load-carrying strands and molded integrally into the plastic body therewith, electric leads extending from the ends of said electro-conductive strand means out of the plastic body, and electrical means adapted to be connected to said leads for determining if the electro-conductive strand means are unbroken to thereby determine the soundness of the plastic body after the making or use thereof, said frangible, electro-conductive strand means being of a strength which will break if the safe limits of stress imposed upon the plastic body are exceeded.

2. In combination, a hollow plastic body, flexible, body-reinforcing load-carrying strands embedded in and extending helically as a continuous tape through the plastic body and molded integrally therewith, flexible, frangible, electro-conductive strand means forming a part of the tape and extending parallel to and coextensive with the load-carrying strands and molded integrally into the plastic body therewith, and electric leads extending from the ends of said electro-conductive strand means out of the plastic body, said frangible, electro-conductive strand means being of a strength which will break in the safe limits of stress imposed upon the plastic body are exceeded.

3. In combination, a hollow plastic body, flexible, body-reinforcing load-carrying strands embedded in and extending continuously through the plastic body and molded integrally therewith, flexible, frangible, electro-conductive strand means forming a part of the load-carrying strands and extending parallel to and coextensive with the load-carrying strands and molded integrally into the plastic body therewith, and electric leads extending from the ends of said electro-conductive strand means out of the plastic body, said frangible, electro-conductive strand means being of a strength which will break if the plastic body is cracked.

4. A reinforced plastic member including a hard, cured plastic body made from a tape wound over itself to form the body, the tape having a plurality of plastic-impregnated, flexible, load-carrying strands extending longitudinally of the tape and parallel to each other, and the tape having a single electro-conductive, plastic-impregnated, flexible but frangible strand means extending longitudinally of the tape and parallel to the load-carrying strands so as to be wound entirely through the plastic body, and electric leads connected to the ends of the electro-conductive strand means and extending outside the body whereby the electrical continuity of the electro-conductive strand means can be tested at any time after the curing of the body to thereby provide a check on the continuity of the body.

5. The combination defined in claim 3 wherein the electro-conductive strand means have an electrically nonconductive core means surrounded by an electro-conductive surface layer.

References Cited in the file of this patent
UNITED STATES PATENTS

| | | |
|---|---|---|
| 2,131,478 | Mann | Sept. 27, 1938 |
| 2,340,146 | Ruge | Jan. 25, 1944 |
| 2,449,883 | De Forest | Sept. 21, 1948 |
| 2,582,341 | Levers et al. | Jan. 15, 1952 |
| 2,848,390 | Whitehurst et al. | Aug. 19, 1958 |